US008419280B2

United States Patent
Kasukawa et al.

(10) Patent No.: US 8,419,280 B2
(45) Date of Patent: Apr. 16, 2013

(54) THIN SLIDE UNIT

(75) Inventors: Tsutomu Kasukawa, Tokyo (JP);
Hiroshi Saito, Tokyo (JP); Eiji Miyazaki, Tokyo (JP)

(73) Assignee: THK Co., Ltd., Tokyo (JP)

( * ) Notice: Subject to any disclaimer, the term of this patent is extended or adjusted under 35 U.S.C. 154(b) by 831 days.

(21) Appl. No.: 11/909,510

(22) PCT Filed: Feb. 10, 2006

(86) PCT No.: PCT/JP2006/302346
§ 371 (c)(1),
(2), (4) Date: Sep. 18, 2008

(87) PCT Pub. No.: WO2006/100846
PCT Pub. Date: Sep. 28, 2006

(65) Prior Publication Data
US 2009/0045711 A1    Feb. 19, 2009

(30) Foreign Application Priority Data
Mar. 24, 2005  (JP) .................................. 2005-086105

(51) Int. Cl.
*F16C 29/06*    (2006.01)
(52) U.S. Cl.
USPC .................................. 384/45; 384/18; 384/43
(58) Field of Classification Search .................... 384/18, 384/43, 45, 49, 7, 21, 22; 312/334.17, 334.38
See application file for complete search history.

(56) References Cited

U.S. PATENT DOCUMENTS 3,353,874 A * 11/1967 Del Vecchio et al. ........... 384/18
3,488,097 A *  1/1970 Fall ................................ 384/18
4,557,530 A * 12/1985 Haase ............................ 384/45

(Continued)

FOREIGN PATENT DOCUMENTS

| JP | 51-119438 U   | 9/1976 |
| JP | 1976-119438 A | 9/1976 |
| JP | 01-093616 A   | 4/1989 |
| JP | 1-93616 A     | 4/1989 |

OTHER PUBLICATIONS

Linear Motion System General Catalogue; THK Co., Ltd., THK The mark of linear Motion, No. 401, Partial English Translation.

(Continued)

*Primary Examiner* — Marcus Charles
*Assistant Examiner* — Thomas Diaz
(74) *Attorney, Agent, or Firm* — Westerman, Hattori, Daniels & Adrian, LLP

(57) ABSTRACT

Provided is a thin slide unit which allows, in a case where two ball plates each formed with a track-like ball groove are combined to thereby construct an endless circulation path for balls, by merely directly connecting the two ball plates without using a guide plate, balls to smoothly circulate, and a slider to smoothly reciprocate with respect to a guide rail. An endless circulation path for the balls of the slider is formed such that the two ball plates each formed with the track-like ball groove are caused to face each other, and that the ball plates are directly connected. Peripheral sides of the two ball plates oppose to each other, to thereby form a load opening portion for causing the balls in the endless circulation path to contact a rolling groove of the guide rail, and form a scooping-up portion for raising the balls from the rolling groove to guide the balls into the endless circulation path.

4 Claims, 5 Drawing Sheets

U.S. PATENT DOCUMENTS

| | | | |
|---|---|---|---|
| 4,647,226 A * | 3/1987 | Mottate | 384/45 |
| 4,662,763 A * | 5/1987 | Itoh | 384/45 |
| 4,749,284 A * | 6/1988 | Teramachi | 384/45 |
| 4,795,272 A * | 1/1989 | Mottate | 384/45 |
| 4,909,637 A | 3/1990 | Mottate | |
| 4,927,273 A * | 5/1990 | Mottate | 384/45 |
| 4,929,096 A * | 5/1990 | Osawa | 384/45 |
| 5,186,545 A * | 2/1993 | Shirai | 384/43 |
| 5,755,516 A * | 5/1998 | Teramachi et al. | 384/45 |
| 7,008,107 B2 * | 3/2006 | Kuwabara | 384/45 |
| 7,645,072 B2 * | 1/2010 | Shimizu | 384/44 |
| 2008/0112656 A1 * | 5/2008 | Shirai et al. | 384/45 |
| 2009/0123096 A1 * | 5/2009 | Shirai | 384/45 |

OTHER PUBLICATIONS

Notification of Transmittal of Translation of the International Preliminary Report on Patentability (Form PCT/IB/338) of International Application No. PCT/JP2006/302346 mailed Mar. 6, 2008 with translation Forms PCT/IPEA/409.

International Search Report of PCT/JP2006/302346, date of mailing May 16, 2006.

* cited by examiner

THIN SLIDE UNIT

TECHNICAL FIELD

The present invention relates to a slide unit used for a slide portion of, a copying machine, a protective cover for a machine tool, a heavy door, or the like, in which a slider mounted to a guide rail via a large number of balls can unrestrictedly move along the guide rail. In particular, the present invention relates to a thin slide unit in which a plurality of metal plates each of which is subjected to press formation are combined with each other so that the slider is equipped with an endless circulation path for the balls.

BACKGROUND ART

There has been conventionally known a linear guide apparatus using a rolling motion of balls, including a guide rail formed with a rolling groove for the balls in a longitudinal direction thereof, and a slider mounted to the guide rail via a large number of balls, and including an endless circulation path for the balls, in which the balls are allowed to circulate in the endless circulation path, and the slider freely reciprocates along the guide rail. Guide rails and sliders of various structures depending on use purposes, applied loads, mounting spaces, and the like, are proposed, and linear guide apparatuses employing such guide rails and sliders are actually on the market. Of those, as a linear guide apparatus which is preferably used for a light-load purpose, applicable to a narrow mounting space, and low in cost, there is known a thin slide unit in which a plurality of metal plates are connected to thereby construct a slider (refer to Non-patent Document 1).

The slide unit includes a guide rail formed into a channel shape having a guide path defined by a pair of side walls, and a slider equipped with a ball carriage moving in the guide path of the guide rail. An inner side surface of each of the side walls of the guide rail is formed with a ball rolling groove. Balls held by the ball carriage are allowed to roll in the ball rolling groove, whereby the slider moves along the guide rail. The slider fixes the base plate to the ball carriage, and a delivery target object is fixed to the base plate. As shown in FIG. 7, the ball carriage includes two ball plates 100, 100, and a guide plate 101 interveningly mounted between the ball plates 100, in which the two ball plates 100, 100 have identical shapes, and face each other thereby being connected. In each of the ball plates 100, there are formed track-like ball grooves 102, and the ball plates 100 are combined so as to face each other, whereby endless circulation paths in which balls 103 circulates are formed.

In the case of combining the two ball plates 100, 100, a load opening portion from which spherical surfaces of the balls 103 in each endless circulation path is formed. The balls 103 come into contact with the ball rolling surface of the guide rail via the load opening portion. Incidentally, the guide plate 101 sandwiched between the two ball plates 100 includes steeple-like guide claws 104 located both ends of the load opening portion in the longitudinal direction. When the ball 103 having rolled in the ball rolling groove of the guide rail reaches an end portion of the load opening portion, the balls 103 climb on the guide claw 104 to be apart from the ball rolling groove, and accommodated in the endless circulation path. Further, when the balls 103 having circulated in the endless circulation path reach the load opening portion, the ball 103 are delivered into the ball rolling groove of the guide rail along the guide claw 104.

In order to suppress production cost, each of the guide rail and the slider of the slide unit is mainly formed by plastic forming of a metal plate. For example, the guide rail is formed as follows. That is, a band-like metal plate is subjected to roll forming processing, so the side walls are bent and raised to thereby form the ball rolling groove, and finally the whole is cut into a predetermined length. Further, each ball plate constructing the ball carriage is formed as follows. That is, a band-like metal plate is subjected to drawing processing at a predetermined interval to thereby form the ball groove, and then the metal plate is cut at a position where the metal plate is slightly overlapped with the ball groove. Thus, the ball plate having a predetermined shape is completed.

Non-patent Document 1: THK Co., Ltd., Linear Motion System General Catalogue No. 401, p. n-3, "Slide Pack FBW."

DISCLOSURE OF THE INVENTION

Problem to be solved by the Invention

In the conventional thin slide unit, a tip portion of the guide claw equipped with the guide plate should move below the balls according to its function for scooping up the balls rolling in the guide rail. Thus, the tip portion of the guide claw should be formed sharply and precisely. In a case where the guide claw is poorly formed, the balls having rolled in the guide rail collides head-on with the guide claw. Accordingly, it is impossible to smoothly scoop up the balls into the endless circulation path, and, in addition, deformation of the guide claws is caused, and abrasion occurs in the early stage. Accordingly, the smooth reciprocation of the slider with respect to the guide rail is lost in the early stage.

However, because the balls are applied with load between the ball plates and the guide rail, the guide plate sandwiched between the pair of ball plates should have a thickness equal to or less than a predetermined thickness with respect to the diameter of the ball. As the diameter of the ball is reduced, the guide plate is made thinner without fail. Accordingly, it is difficult to precisely form the guide claws into the steeple shape, and thus the guide plate hinders the smooth circulation of the balls. In addition, even when the guide claws are precisely formed, when a plate thickness of the guide plate is smaller, deformation of the guide claws is caused and abrasion occurs in the early stage, with the result that smooth circulation of the balls is lost in the early stage, which is problematic.

In addition, the ball plates and the guide plate are connected to each other by rivets. However, in a case where the position of the guide plate with respect to the ball plates is inappropriate, the tip portions of the guide claws collide with the vicinity of a center of each ball, with the result that the smooth circulation of the balls is hindered, and the guide claws deform in the early stage. Accordingly, after the rivets are caulked, deviation of the ball plates and the guide plate is measured, and in a case where the deviation occurs, the step of modifying the deviation is required, which means that the slider is assembled laboriously and which is problematic.

Incidentally, because the guide claws move below the balls rolling in the guide rail to scoop up the balls, at a center of the ball rolling groove of the guide rail, there is required a clearance groove for accommodating the guide claws, and the guide claws move in the clearance groove. However, when the guide claws are deformed as described above, the guide claws come into contact with side walls of the clearance groove, so sliding resistance of the slider with respect to the guide rail increases, which is problematic.

Further, the clearance groove is formed such that the guide rail is subjected to roll forming processing at the time when the ball rolling groove is formed. Because a width of the clearance groove corresponds to the thickness of the guide plate and is extremely small, a lifetime of a roll forming die used to form the clearance groove is made short, and thus a manufacturing cost increases when the die is exchanged, which is problematic. Further, because the clearance groove is formed in the center of the ball rolling groove, a width of the guide rail reduces at a formation portion of the clearance groove, which lowers stiffness of the guide rail.

Further, the ball carriage is assembled such that the guide plate is sandwiched between the two ball plates, and those plates are caulked by the rivets. Because the tip end of the guide claw is sharp as described above, in the case of assembling the ball carriage, enough attention should be paid to securing safety for an operator, which deteriorates workability.

Means for Solving the Problems

The present invention has been made in view of the above problems, and it is an object of the present invention to provide a thin slide unit which allows, in a case where two ball plates each formed with a track-like ball groove are combined to thereby construct an endless circulation path for balls, by merely directly connecting the two ball plates without using a guide plate, balls to smoothly circulate, and a slider to smoothly reciprocate with respect to a guide rail.

The thin slide unit according to the present invention includes: a guide rail in which a rolling groove for balls is formed; and a slider equipped with a large number of balls rolling in the rolling groove, and including an endless circulation path for the balls, which is movable along the guide rail. The endless circulation path for the balls of the slider is formed such that two ball plates each formed with a track-like ball groove are caused to face each other, and that the ball plates are directly connected. The ball grooves formed in the respective two ball plates face each other, whereby the ball grooves cooperate to form the track-like endless circulation path for the balls.

In the case of combining the two ball plates, peripheral sides of the ball plates oppose to each other, to thereby form in the slider a load opening portion causing the balls in the endless circulation path to be exposed. The balls rolling in the endless circulation path contact the rolling groove of the guide rail via the load opening portion, and are applied with load between the ball plates and the guide rail. In addition, the peripheral sides of the two ball plates oppose to each other as described above, to thereby form, at both ends of the load opening portion in a longitudinal direction thereof, scooping-up portions for the balls. The scooping-up portions gradually raise the balls rolling in the rolling groove of the guide rail from the both sides, and cause the balls to separate from the rolling groove of the guide rail to guide the balls into the endless circulation path.

According to the present invention as structured above, the balls can circulate in the endless circulation path of the slider without interposing a guide plate between the two ball plates combined face-to-face. Thus, a guide claw in which deformation or abrasion is liable to occur can be omitted. Accordingly, smooth ball circulation can be attained for a long period of time. Further, lightsome reciprocation of the slider with respect to the guide rail can be secured for a long period of time.

In addition, because no guide plate is required, the step of measuring and modifying deviation of the ball plates and the guide plate after assembly is not required, and the assembly of the slider can be readily finished in a short period of time by this amount, whereby the manufacturing cost can be reduced.

Incidentally, because the guide claw is omitted, no clearance groove for accommodating a guide claw is required in the ball rolling groove of the guide rail, so exchange frequency of the roll forming die which is used to process the guide rail can be reduced, whereby the manufacturing cost can be reduced. Further, by omitting the clearance groove, the stiffness of the guide rail is increased at a formation position of the rolling groove, so the thickness of the guide rail can be reduced by this amount, and the material cost can be reduced.

DESCRIPTION OF REFERENCE NUMERALS

1 . . . guiderail, 2 . . . ball, 3 . . . slider, 5 . . . scooping-up portion, 30 . . . ball carriage, 31 . . . ball plate, 32 . . . ball groove, 36 . . . load opening portion, 40 . . . bent portion.

BEST MODE FOR CARRYING OUT THE INVENTION

Hereinafter, the thin slide unit according to the present invention will be described in detail with reference to the accompanying drawings.

Figure 1:
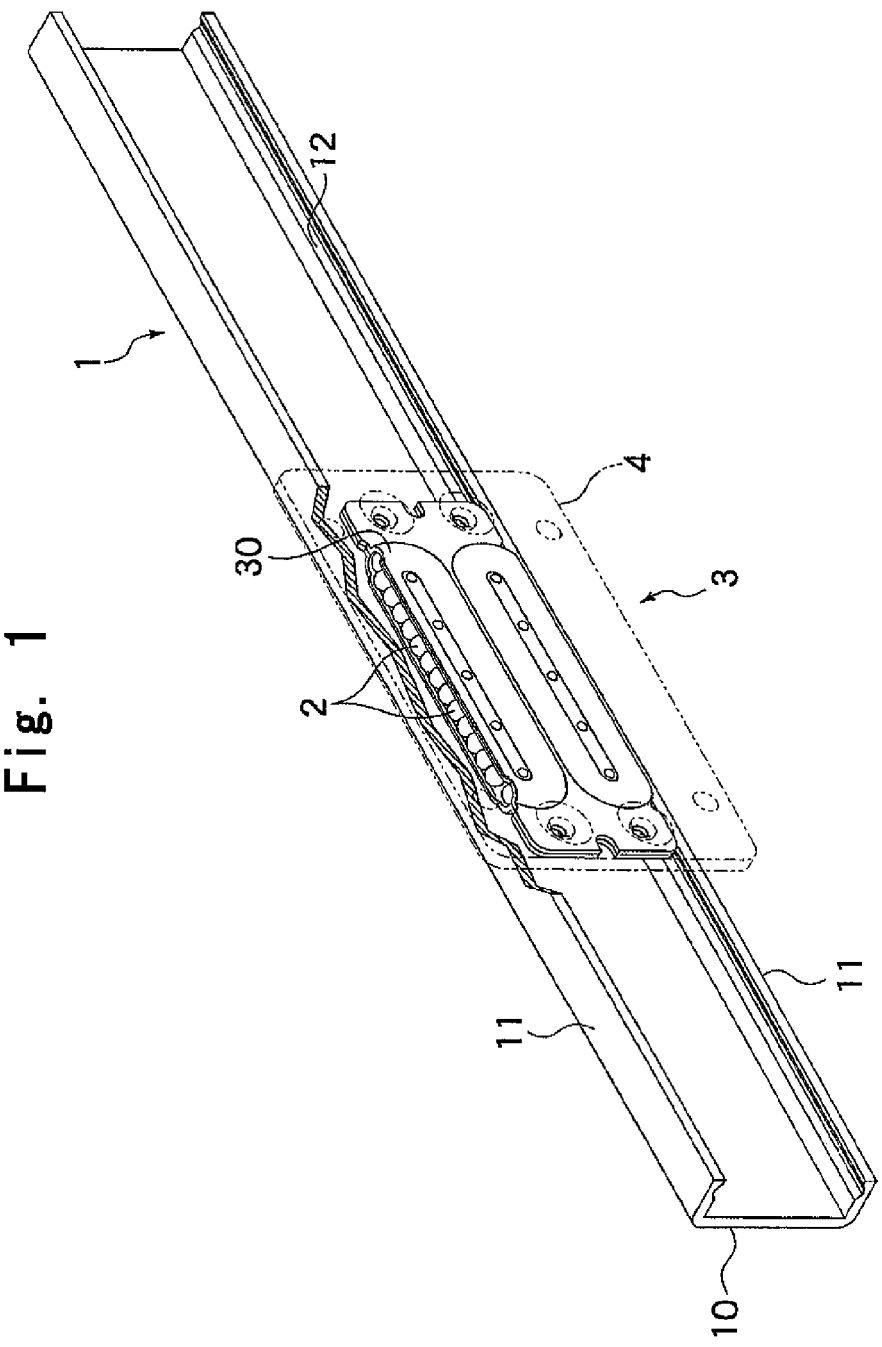
FIG. 1 is a perspective view showing an example of a thin slide unit to which the present invention is applied.

FIG. 1 shows an example of a slide unit to which the present invention is applied. The slide unit includes a guide rail 1 and a slider 3 mounted to the guide rail 1 via a large number of balls 2. The slider 3 freely reciprocates along the guide rail 1.

The guide rail 1 is formed into a channel shape in which a pair of side walls 11, 11 are straightly raised from a base portion 10. A space surrounded by the base portion 10 and the side walls 11 serves as a guide path of the slider 3. In an inner side surface of each of the side walls 11, which faces the guide path, one rolling groove 12 is formed in a longitudinal direction of the guide rail 1. The rolling grooves 12 oppose to each other with an intermediation of the guide path. Each rolling groove 12 is formed in a so-called gothic arch shape in which two ball rolling surfaces are substantially orthogonally crossed. Note that the guide rail 1 is fixed to a mount-target portion of a machine device or the like by a fixing screw penetrating the base portion 10.

Further, the guide rail 1 is made of a band-like metal thin plate. The metal thin plate is subjected to roll forming processing, so the side walls 11 are bent and raised with respect to the base portion 10, and the rolling groove 12 is formed in each side wall 11. The guide rail 1 is continuously formed by the roll forming processing while the metal thin plate is letting out. The guide rail 1 is cut into a predetermined length depending on purposes, and then is processed so as to be formed with a penetrating hole (not shown) or the like into which the fixing screw is allowed to penetrate.

Incidentally, the slider 3 includes a ball carriage 30 reciprocating in the guide path of the guide rail 1, and a base plate (represented by the chain double-dashed lines in the figure) 4 fixed to the ball carriage 30. A movable body to be guided of a table, a door, or the like is screwed to the base plate 4. Further, the ball carriage 30 includes a pair of endless circulation paths for the balls 2, and each endless circulation path corresponds to each rolling groove 12 for the balls 2 formed in each of the pair of side walls 11 of the guide rail 1.

Figure 2:
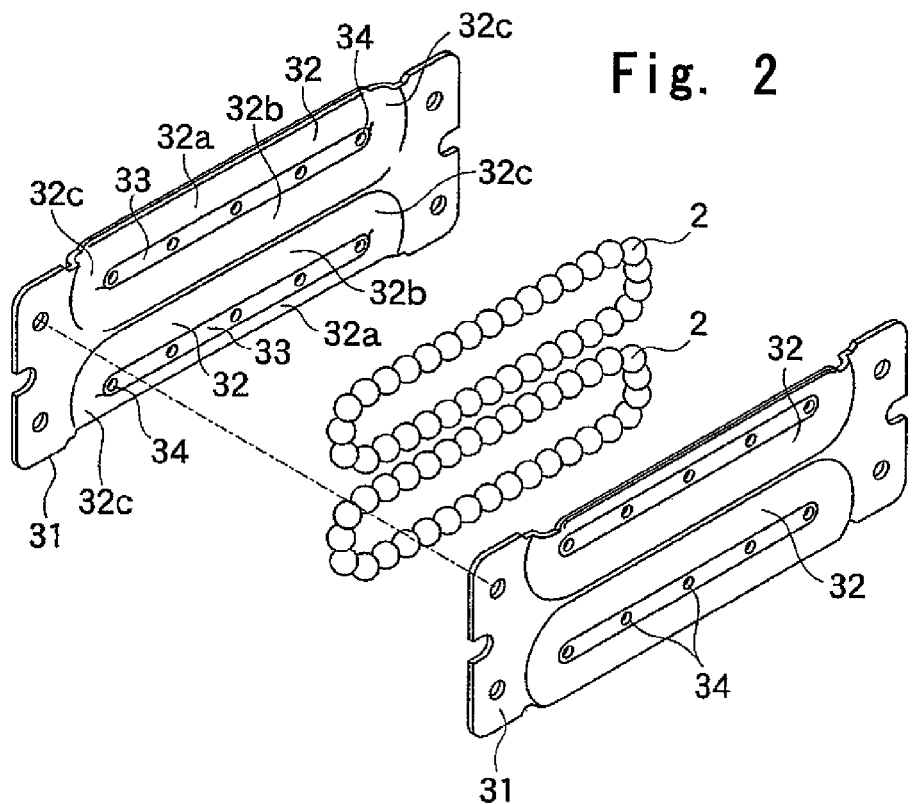
FIG. 2 is an exploded view showing a ball carriage of the slide unit shown in FIG. 1.

FIG. 2 is an exploded perspective view showing the ball carriage 30 described above. The ball carriage 30 includes a pair of ball plates 31, 31 formed into identical shapes. In each ball plate 31, a pair of track-like ball grooves 32 are formed. The ball plates 31 are combined such that the ball grooves 32 oppose to each other. The large number of balls 2 intervene between the ball grooves 32 of one ball plate 31 and the ball grooves 32 of the other ball plate 31. That is, by connecting the two ball plates 31, 31 in an opposing manner, the endless circulation paths for the balls 2 are formed.

Each ball groove 32 above includes a load groove portion 32a formed along a peripheral portion of a long side of the ball plate 31, a loadless groove portion 32b formed in parallel with the load groove portion 32a, and direction switching groove portions 32c for switching travelling directions of the balls 2 by 180 degrees between the load groove portion 32a and the loadless groove portion 32b. A groyne 33 is formed between the load groove portion 32a and the loadless groove portion 32b. When the pair of ball plates 31, 31 are combined, the groynes 33 of the both ball plates 31 are jointed one another via rivets. In FIG. 2, each reference numeral 34 denotes a penetrating hole in which the rivet is inserted.

Figure 3:
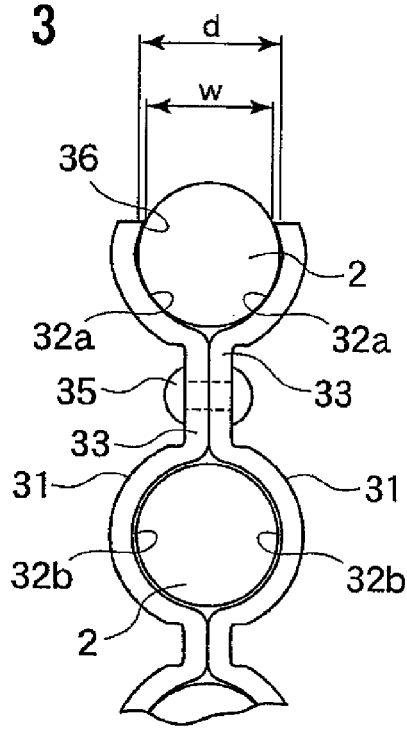
FIG. 3 is across-sectional view showing an endless circulation path for balls, which is formed in the ball carriage.

FIG. 3 is a cross-sectional view showing an endless circulation path for the balls 2, which is formed by connecting the pair of ball plates 31. As described above, the pair of ball plates 31 are caused to face each other such that the ball grooves 32 oppose to each other. The rivet 35 penetrating the groyne 33 is caulked so as to directly connect the ball plates 31, 31. Then, the load groove portions 32a oppose to each other to thereby form a load path, and the loadless groove portions 32b oppose to each other to thereby form a loadless path. In addition, the direction switching groove portions 32c oppose to each other to thereby form direction switching paths. Thus, the tunnel-like endless circulation path is formed, and the balls 2 are arrayed in the endless circulation path. Further, each load groove portion 32a is formed along the peripheral portions of the ball plates 31, and does not completely cover spherical surfaces of the balls 2 by 180 degrees. As shown in FIG. 3, in the state where the pair of ball plates 31 are connected, a load opening portion 36 at which the load groove portion 32a is released is formed, and a portion of the spherical surface of each ball rolling inside the load groove portion 32a is allowed to expose to the outside of the ball carriage 30 from the load opening portion 36. The balls 2 contact the rolling groove 12 of the guide rail 1 via the load opening portion 36. That is, the peripheral portions of the ball plates 31 oppose to each other to thereby form the load opening portion 36.

As shown in FIG. 3, the loadless path formed such that the loadless groove portions 32b face each other has an inner diameter larger than a diameter of each ball 2. Thus, the balls 2 roll in the loadless path in a loadless state. In addition, also in the direction switching path formed such that the direction switching groove portions 32c face each other, the balls 2 roll in the loadless state. On the other hand, in the load path formed such that the load groove portions 32a face each other, the balls 2 are sandwiched between the rolling groove 12 of the guide rail 1 and the groynes 33 of the ball plates 31. Thus, the balls 2 roll in the load path while being applied with load.

Figure 4:
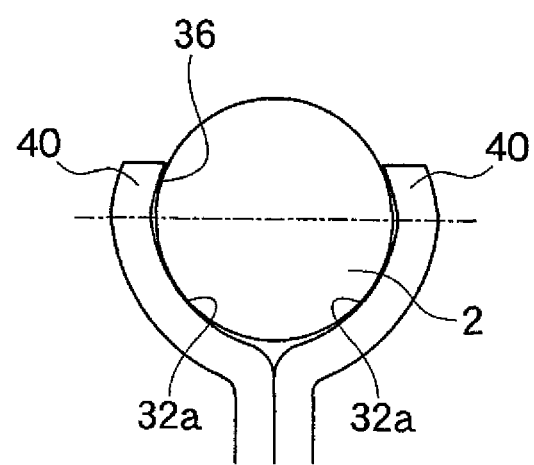
FIG. 4 is an enlarged cross-sectional view showing in detail a load opening portion provided to the ball carriage.

In order that, when the ball carriage 30 is pulled out of the guide path of the guide rail 1 to separate the slider 3 from the guide rail 1, the balls 2 not fall out of the endless circulation path of the ball carriage 30, an opening width W of the load opening portion 36 is formed slightly smaller than the diameter of the ball 2. As shown in FIG. 4, the load groove portion 32a is formed into a depth with which the load groove portion 32a slightly covers an equator of each ball 2 represented by the dot-dashed line shown in the figure. By forming bent portions 40 in the peripheral portions of the ball plates 31 forming the load opening portion 36, the opening width W of the load opening portion 36 is made smaller than the diameter of each ball 2.

Figure 5:
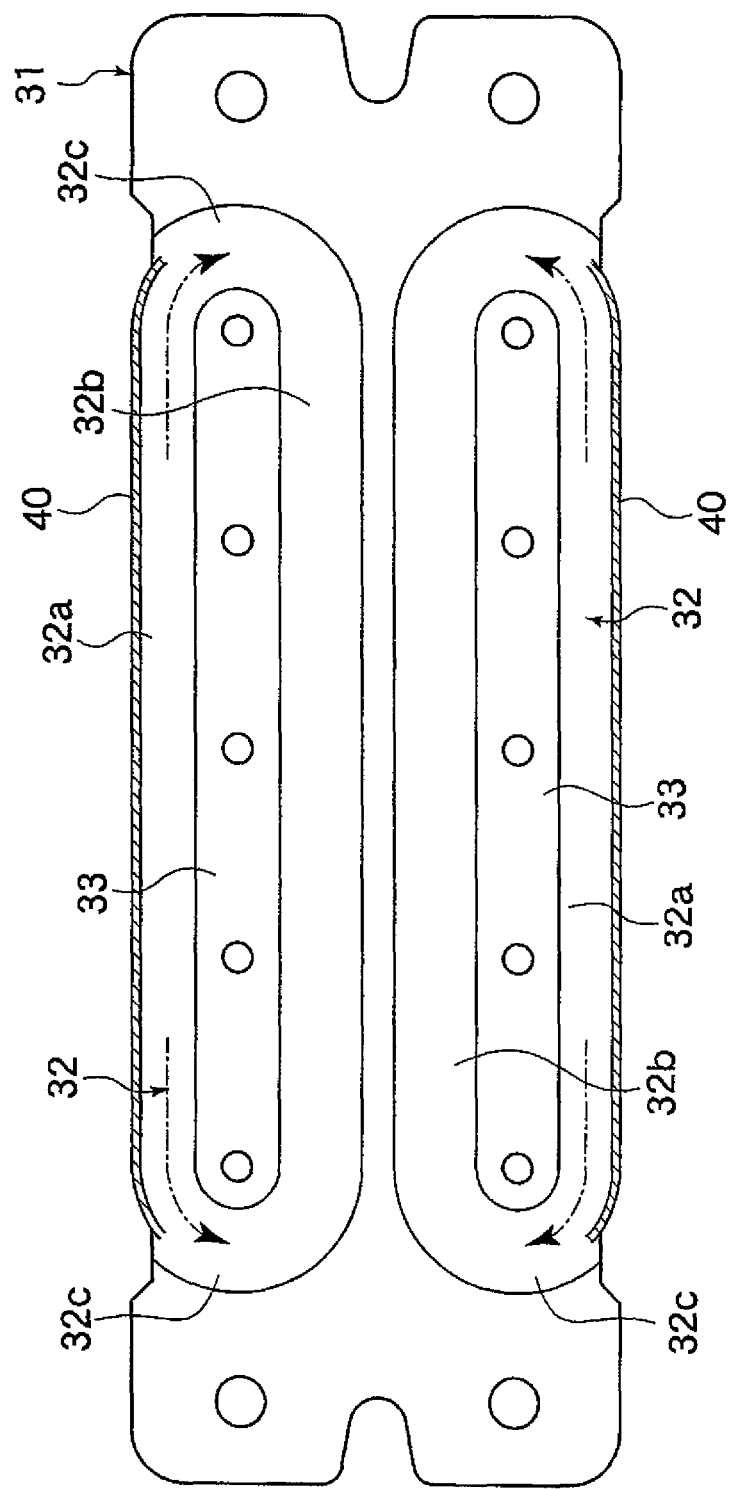
FIG. 5 is a plan view showing a ball groove side of a ball plate.

FIG. 5 is a plan view showing a formation plane of the ball grooves of the ball plate 31. In the figure, a hatched area shown in the peripheral portion of each long side of the ball plate 31 represents the bent portion 40. The bent portion 40 is formed in the peripheral portion of the ball plate 31 in each load groove portion 32a. At both ends of each load groove portion 32a in the longitudinal direction (ball rolling direction), the bent portion 40 is formed along the travelling directions of the balls 2 in the direction switching groove portions 32c, and is continuously formed in the direction switching groove portions 32c.

Figure 6:
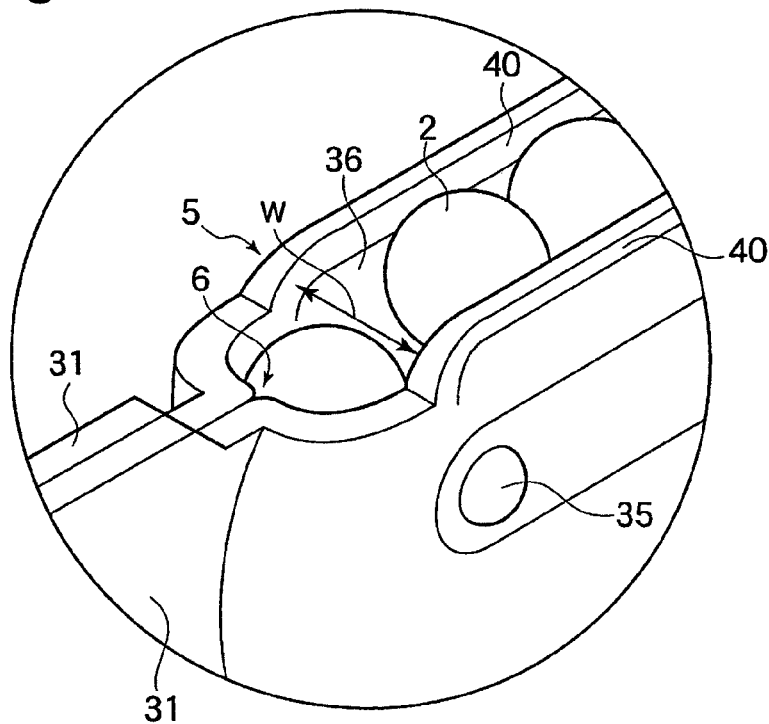
FIG. 6 is an enlarged perspective view showing a scooping-up portion of the balls.
Figure 7:
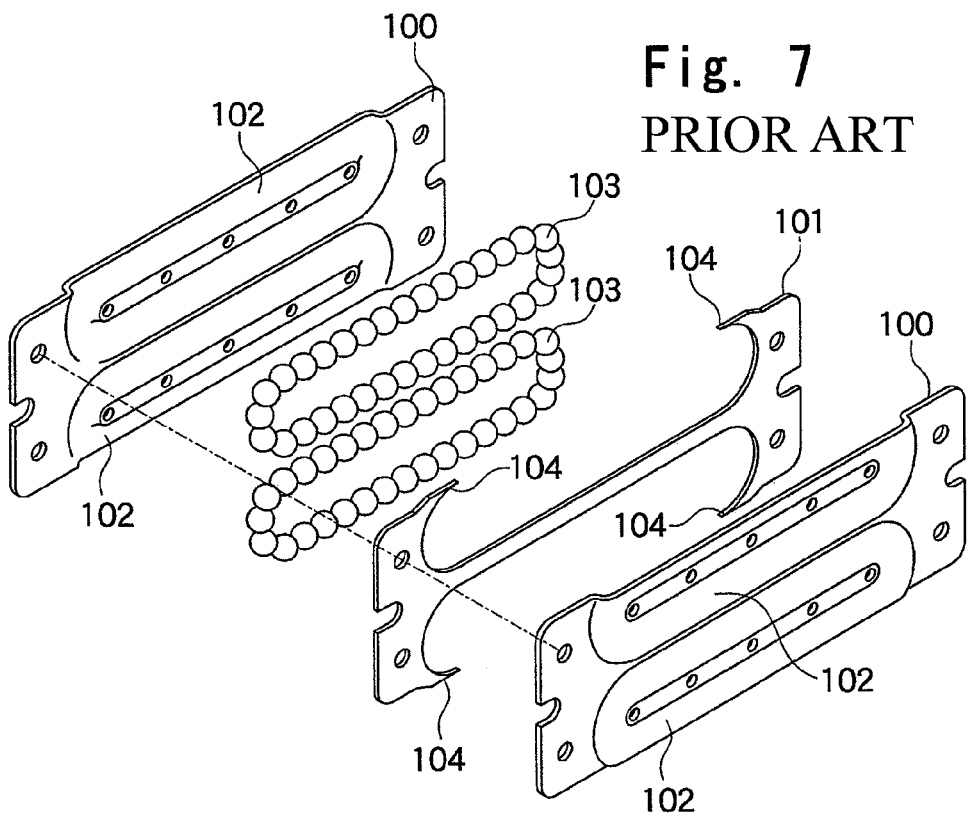
FIG. 7 is an exploded perspective view showing a conventional ball carriage.

Thus, as shown in FIG. 6, at each end of the load opening portion 36 in the longitudinal direction, the opening width W is equal to or smaller than a diameter d of each ball 2. When the ball 2 having rolled in the load groove portion 32a reaches the end portion of the load opening portion 36, the traveling direction thereof gradually changes while being guided by the bent portion 40. Then, the ball 2 directly enters the direction switching groove portion 32c. That is, as indicated by each dot-dashed line in each ball groove 32 of FIG. 5, when the ball 2 having rolled in the load groove portion 32a while being applied with load reaches an end portion of the load groove portion 32a, the traveling direction thereof is restricted by the bent portion 40, which is curved toward the direction switching groove portion 32c. Further, the traveling direction is gradually changed in a curve direction of the direction switching groove portion 32c.

Accordingly, in the slide unit, the pair of ball plates 31, 31 are caused to face each other so as to be directly connected. Thus, the curved portions 40 formed in the peripheral portions of the ball plates 31 oppose while having a gap smaller than the diameter of each ball 2, so scooping-up portions 5 are formed in the both ends of each load groove portion 32a. Accordingly, the ball 2 having rolled in each rolling groove 12 of the guide rail 1 departs from the rolling groove 12 so as to be accommodated in the endless circulation path of the ball carriage 30.

The ball plate 31 is made of a metal thin plate. To be specific, the metal thin plate is first punched out into an outer shape of the ball plate 31. Then, the ball grooves 32 are formed by being subjected to shape drawing processing twice. Next, after the penetrating holes 34 through which the rivets 35 are inserted are punched out, in order to form the load opening portion 36, shape cutting is performed such that a portion of each load groove portion 32a of each ball groove 32 is cut out. Finally, the hatched areas shown in FIG. 5 is subjected to surface-pressing formation, to thereby form the curved portions 40. In a case of not performing the final surface-pressing formation, an opening width of each load opening portion 36 is unstably defined. Thus, even when the ball carriage 30 is constructed by combining the ball plates 31, there is a fear that the balls 2 fall out of the load opening portion 36. Accordingly, the balls 2 cannot be held in the endless circulation path in a reliable manner. Further, with respect to the ball 2 having rolled to the end portion of each load opening portion 36 in the longitudinal direction, a force for guiding the ball 2 in the curve direction of the direction switching groove portion 32c does not operate. Thus, the ball 2 is caused to collide with a joint portion (a position indicated by reference numeral 6 in FIG. 6) of the ball plates 31 at the end portion of the load opening portion 36. A large resistance force of the slider 3 acts with respect to the circulation of the balls 2. Thus, sliding resistance of the slider 3 increases, and a strident noise generates when the slider 3 is in move.

However, the bent portions 40 are formed in the peripheral sides of the ball plates 31, and each bent portion 40 structures the scooping-up portion 5 which is continuously formed from the load opening portion 36 so as to have the same opening width. In this case, with regard to the balls 2 having rolled in the load opening portion 36 while being applied with load between the guide rail 1 and the ball carriage 30, the rolling direction thereof directly changes in the curve direction of the direction switching groove portion 32c. The balls 2 are smoothly scooped up from the rolling groove 12 of the guide rail 1, and can be shifted into the loadless state.

Further, in order to attain the smooth circulation of the balls 2, there is no need for the pair of ball plates 31 to sandwich a guide plate having guide claws. Thus, various problems caused by the presence of the guide claws can be solved.

The invention claimed is:

1. A thin slide unit, comprising:
a guide rail in which a rolling groove for balls is formed; and
a ball carriage equipped with a plurality of balls rolling in the rolling groove, and including an endless circulation path for the balls, which is movable along the guide rail, wherein:
the ball carriage is formed such that two ball plates each formed with a ball groove are caused to face each other, and that the ball plates are directly connected;
the ball groove includes a load groove portion formed along peripheral portions of the ball plates, in which the balls roll while being applied with a load between the ball groove and the guide rail;
a loadless groove portion formed in parallel with the load groove portion, in which the balls roll in a loadless state;
a pair of direction switching groove portions for allowing the balls to come and go between the load groove portion and the loadless groove portion;
peripheral sides of the two ball plates are opposed to each other, to thereby form a load opening portion causing the balls rolling in the load groove portion to contact the rolling groove of the guide rail, and form a scooping-up portion for separating the balls from the rolling groove to guide the balls to the direction switching groove portions at each end of the load opening portion in the longitudinal direction;
an opening width of the scooping-up portion being formed smaller than a diameter of each of the balls, the scooping-up portion being bent from the load opening portion to curve into each of the direction switching groove portions, and the scooping-up portion directing the balls to enter into each of the direction switching groove portions; and
wherein the scooping-up portion bends from the load opening portion to curve into the direction switching groove portions at a location different than a curvature of the direction switching groove portions.

2. A thin slide unit according to claim 1, wherein:
the peripheral portion of each of the ball plates is formed with a bent portion which is continuously formed from the load opening portion to the scooping-up portion; and
the bent portions are caused to face each other, the load opening portion is formed such that the opening width of the load opening portion is the same as the opening width of the scooping-up portion.

3. A thin slide unit according to claim 1, wherein:
the guide rail is formed into a channel shape having a guide path defined by a pair of side walls, an inner side surface of each of the side walls being formed with one rolling groove for the balls; and
said ball carriage includes a pair of endless circulation paths each corresponding to the rolling groove, and reciprocates in the guide path of the guide rail.

4. A thin slide unit, comprising:
a guide rail in which a rolling groove for balls is formed; and
a ball carriage equipped with a large number of balls rolling in the rolling groove, and including an endless circulation path for the balls, which is movable along the guide rail, wherein:
the ball carriage is formed such that two ball plates each formed with a ball groove are caused to face each other, and that the ball plates are directly connected;
the ball groove includes a load groove portion formed along peripheral portions of the ball plates, in which the balls roll while being applied with a load between the ball groove and the guide rail;
a loadless groove portion formed in parallel with the load groove portion, in which the balls roll in a loadless state;
a pair of direction switching groove portions for allowing the balls to come and go between the load groove portion and the loadless groove portion;
a bent portion formed in the peripheral portion of the ball plate in each load groove portion and continuously formed to curve along travelling directions of the balls entering into the direction switching groove portions at ends of the load groove portion;
peripheral sides of the two ball plates are opposed to each other, to thereby form a load opening portion causing the balls rolling in the load groove portion to contact the rolling groove of the guide rail, and form a scooping-up portion having a gap smaller than the diameter of each ball such that the bent portion oppose each other;
the scooping-up portion includes the bent portion curving along the travelling directions of the balls entering into the direction switching groove portions at ends of the load groove portion and guides the balls at the end of each load opening portion to enter into the direction switching groove portion without colliding with a location at which the ball plates meet at an entrance to the direction switching groove portion; and
wherein the scooping-up portion bends from the load opening portion to curve into the direction switching groove portions at a location different than the location at which the ball plates meet at the entrance to the direction switching groove portion.

* * * * *